United States Patent Office

3,408,171
Patented Oct. 29, 1968

3,408,171
PROCESS OF STEAM REFORMING
PARAFFINIC HYDROCARBONS
Samuel Pupko, Toulouse, France, assignor to Office National Industriel de l'Azote, Toulouse, France, a corporation of France
No Drawing. Original application Oct. 5, 1964, Ser. No. 401,650. Divided and this application June 12, 1967, Ser. No. 645,492
2 Claims. (Cl. 48—214)

ABSTRACT OF THE DISCLOSURE

A process for continuous pressure steam reforming of paraffinic hydrocarbons to obtain hydrogen-rich gases by contacting the hydrocarbons and steam with a catalyst having a nickel oxide content of 3-35% by weight on a support which is a mixture of magnesia and magnesium silicate, with the molar ratio of steam/carbon being between 2-5.

---

This is a division of Ser. No. 401,650, filed Oct. 5, 1964.

In hydrocarbon reforming processes in the presence of water vapor to produce a gas containing hydrogen and carbon monoxide, there are generally used catalysts having a nickel base with a support containing one or more refractory oxides and with a binder which may be added to increase the cohesion and physical strength of the elemental grains. Several active masses of that type, prepared from magnesia and stabilized when needed with titanium oxide or alumina, have already been described by the applicant.

As a result of important work relating to the activity and selectivity of such catalysts in the presence of complex reactions occurring between hydrocarbons and steam, a new type of contact mass, based on nickel and a magnesia and silicomagnesia support practically free of alumina, which is the object of the present invention, has been developed by the applicant.

Outstanding results can be achieved with these catalysts, particularly when they are used in gaseous or liquid hydrocarbon reforming, alone or in admixture, such as natural gas, liquefiable petroleum gases, petroleum light fractions, etc., for producing gases containing hydrogen and carbon monoxide under a pressure of 1 to 50 kg./sq. cm.

By operating at very low molar steam/carbon of the hydrocarbon ratios of between 2 and 5, their selectivity and strength are such that no increase in pressure drop due to carbon deposits and/or attrition or erosion of the mass in the catalyst-holding tubes is detectable in operation.

Owing to the activity of such catalysts, largely due to the physical state of the nickel and the participation of the support in the various reactions occurring, the overall efficiencies of the transformation are excellent at comparatively low temperatures.

The procedures for preparing catalysts according to the present invention consists in incorporating in nickel and heavy magnesia, practically free from alumina, a large amount of one or more synthetic magnesia silicates such as ortho- and metasilicate, or natural ones such as talc ($3MgO, 4SiO_2, H_2O$), serpentine ($3MgO, 2SiO_2, 2H_2O$), sepiolite ($3MgO, 4SiO_2, 5H_2O$), etc.

According to a preferred manufacturing procedure, magnesia and magnesia silicate or silicates are kneaded in the semi-liquid phase in the presence of an aqueous solution of a decomposable salt of nickel, the three components of the mixture being in the required proportions. The operation is completed by neutralising the medium with a dilute solution of alkaline carbonate or ammonium bicarbonate which results in rendering the nickel insoluble in the form of the carbonate. After dewatering and washing with water, the product is dried and then calcined at 400–500° C.

Where final shaping is carried out by pelletizing under low pressure or by extrusion, it is necessary to add a binder to the mass during the manufacturing operation. This addition, in the form of an aqueous and concentrated solution of sodium silicate and/or hydraulic cement, is carried out after calcination and before final shaping.

The contact masses prepared according to the invention have the following compositions by weight, the eventually incorporated binders not being taken into account:

| | Percent |
|---|---|
| NiO | 3 to 35 |
| Free and combined MgO | 30 to 70 |
| Combined SiO$_2$ | 10 to 35 |

The following examples of embodiments of the invention are given to better illustrate how the catalysts of the invention can be prepared and the results they achieve in the particular case of continuous pressure reforming of gaseous or vaporizable liquid hydrocarbons in the presence of steam, and are not limitative.

These results are compared with those obtained by utilizing known catalysts, having the same content of nickel, but wherein the support is essentially magnesia in the catalyst identified as Type A, and a magnesia silicate such as the metasilicate in the catalyst identified as Type B; neither support containing a combination of the two compounds.

Example 1

A kneading mill is charged with 33 kg. of calcined magnesia, 17 kg. of magnesia silicate of formula $3MgO, 4SiO_2, H_2O$ and 97.2 kg. of hexahydrated nickel nitrate in an aqueous solution. To the homogeneous mass obtained by kneading there is added an aqueous solution of ammonium bicarbonate to neutralize the medium at the end of the operation. The product is dewatered, washed with water, dried, then calcined at 500° C. A pulverulent mass is thus obtained which is treated in a second kneading mill, after adding 10 liters of sodium silicate in a 40% aqueous solution and 25 kg. of artificial cement thereto. The homogeneous product resulting from this operation is shaped into cylindrical rods in an extruding machine. It is placed in a water-saturated atmosphere then left in open air for 24 hours and dried.

Eighty liters of the catalyst thus obtained are charged into each of the catalyst-holding tubes of an apparatus intended for the continuous pressure conversion of natural gas with water vapor. After several hours during which the catalyst is subjected to reduction with hydrogen of the nickel oxide contained therein, the apparatus is put into operation, each tube being fed with a mixture preheated to 550° C. containing 62.5 cu. meters/ hour of natural gas and 187.5 cu. meters of steam under a pressure of 20 kg./sq. cm. The molar ratio steam/carbon of natural gas is 3.

The composition and gross heating value of the gaseous product produced in the presence of catalysts Type A and Type B are as follows:

| Type Catalyst | Production cu. meters per hour | Composition of the gas product, percent | | | | | | | | Percent $C_4$ Hydrocarbons | Gross heating value | Non-Cracked Condensate |
|---|---|---|---|---|---|---|---|---|---|---|---|---|
| | | $CO_2$ | CO | $H_2$ | $CH_4$ | $C_2H_6$ | $C_2H_4$ | $C_3H_8$ | $C_3H_6$ | | | |
| A | 14,000 | 18.3 | 4.7 | 61.5 | 8.0 | 2.4 | 1.9 | 0.5 | 2.0 | 1.2 | 4,362 | 250 |
| B | 13,200 | 18.0 | 4.7 | 60.6 | 7.9 | 2.8 | 2.0 | 0.1 | 2.1 | 1.8 | 4,500 | 400 |

At an average temperature of 775° C. measured at the outlet of the tubes, 208 cu. meters/hour of gas containing 9.9% of $CO_2$, 10.2% of CO, 70.0% of $H_2$ and 9.9% of $CH_4$ is obtained.

For purposes of comparison the catalyst identified as Type A having a base of nickel and a support of magnesia under the same operating conditions yields 196 cubic meters of a gas containing: 10.5% $CO_2$, 8.7% CO, 68% $H_2$, and 12.6% $CH_4$.

The activity of the catalyst B, having a base of nickel and a support of magnesia silicates is even less effective for it yields 188 cubic meters of a gas having the following volumetric composition: 10.8% $CO_2$, 8% CO, 67.2% $H_2$ and 14.0% $CH_4$.

Example 2

Fifty kg. of calcined magnesia, 25 kg. of magnesium silicate (3 MgO, 4 $SiO_2$, 5 $H_2O$) and 97.2 kg. of hexahydrated nickel nitrate are kneaded in aqueous solution. The mass is neutralised by adding an aqueous solution of ammonium bicarbonate and the product is treated as specified in the preceding example. After calcination, it is kneaded again in the presence of 8 liters of an aqueous solution of 40% sodium silicate, pressure-shaped into rings and finally dried in the air.

Each unit, consisting of a 100 catalyst-holding tube bundle, is charged with 100 liters of catalyst and the reducing treatment is effected.

(a) Production of hydrogen-rich gas

All nickel in the contact mass being in the reduced state, a mixture preheated to 550° C. consisting of 60 liters/hour of naphtha of density 0.66, previously desulphurized and vaporized, and 187.5 cu. m./hour of steam under a pressure of 20 kg./sq. cm. is fed into each tube. The molar steam/carbon of the petroleum fraction is 3.

At an average catalyst temperature of 775° C. at the outlet, there are obtained wtih the 100 tubes, 17,000 cu. m./hour of gas containing: 14.3% of $CO_2$, 12.6% of CO, 64.7% of $H_2$, 8.4% of $CH_4$.

Under the same operating conditions, catalyst Type A produces 16,000 cubic meters of a gas containing: 15.4% $CO_2$, 11.0% CO, 62.7% $H_2$, and 10.9% $CH_4$, whereas the catalyst Type B furnishes 15,500 cubic meters of gas containing: 16% $CO_2$, 10.2% CO, 61.5% $H_2$, and 12.3% $CH_4$.

(b) Production of gas directly substitutable for 4,200 cal./cu. m. town gas

The catalyst having been reduced, a mixture preheated to 450° C. consisting of 75 liters/hour of petrol of density 0.66 containing 250 p.p.m. of sulphur compounds and 234 cu. m./hour of steam under a pressure of 20 kg./sq. cm. is fed into each tube. The molar ratio steam/carbon of the petroleum fraction is 3.

At an average temperature of 675° C., at the outlet of the tubes, the plant yields 16,000 cu. m./hour of pressure gas containing: 18.2% of $CO_2$, 3.3% of CO, 64.3% of $H_2$, 6.2% of $CH_4$, 2.6% of $C_2H_6$, 1.7% of $C_2H_4$, 0.5% of $C_3H_8$, 2.0% of $C_3H_6$, and 1.2% of $C_4$ hydrocarbons. The gross heating value of this gas is 4,296 cal./cu. m.

All the petrol is reformed and no condensable products are observed in the manufactured gas.

Example 3

By operating as described in the preceding examples, a catalyst is prepared with 58.4 kg. of heavy magnesia, 29.2 kg. of magnesium metasilicate and 50 kg. of hexahydrated nickel nitrate in aqueous solution, without adding any binder.

Each tube in a reforming plant is charged with 80 liters of active mass shaped into cylindrospherical pellets.

A mixture preheated to 550° C. consisting of 16 cu. m./hour of refinery butane and 192 cu. m./hour of steam, wherein the molar ratio steam/carbon of butane is 3, is fed into each catalyst-holding tube under a pressure of 20 kg./sq. cm. At an average temperature of 775° C. at the outlet of the tubes, there are obtained for each tube 186 cu. m./hour of gas of the following composition by volume: 13.6% of $CO_2$, 12.3% of CO, 65.5% of $H_2$, and 8.6% of $CH_4$.

Under identical conditions, conventional catalysts containing the same content of nickel produced the following inferior results.

Catalyst Type A.—171 cubic meters of gas containing: 15.2% $CO_2$, 10.9% CO, 62.9% $H_2$, and 11.0% $CH_4$.

Catalyst Type B.—166 cubic meters of gas containing: 15.8% $CO_2$, 10.1% CO, 61.7% $H_2$, and 12.4% $CH_4$.

Thus it is seen that a nickel based catalyst having 3–35% nickel with a catalyst support of magnesia and magnesium silicates, with a binder if desired, gives superior results over conventional catalysts for the continuous reforming under pressure of 1–50 kg./sq. cm. in the presence of steam, of liquid paraffinic hydrocarbons such as natural gas, liquefiable petroleum gases and/or light petroleum fractions into gaseous products containing hydrogen and carbon monoxide.

What is claimed is:

1. A process for the continuous pressure reforming of paraffinic hydrocarbons in the presence of steam to obtain hydrogen-rich gases which comprises contacting the hydrocarbons and steam under suitable operating conditions with a catalyst having a nickel oxide content of 3–35% by weight; with an alumina-free support which is a mixture of free magnesia and at least one magnesium sicilate, the percentage by weight of free and combined MgO being 30–70% and the percentage by weight of combined $SiO_2$ being 10–35%, the molar ratio of steam/carbon of the hydrocarbon being between 2–5.

2. The process of claim 1 wherein the magnesia is magnesia which has been calcined at 400–500° C. and the magnesium silicate is selected from the group consisting of synthetic magnesium orthosilicate, synthetic magnesium metasilicate, talc, serpentine and sepiolite.

References Cited

UNITED STATES PATENTS 2,137,101  11/1938  Spicer _____ 252—459 XR
3,147,092  9/1964   De Baun et al. ____ 252—459 XR
3,271,325  9/1966   Davies et al. _____ 48—214 XR

FOREIGN PATENTS 899,652  6/1962   Great Britain.
903,357  8/1962   Great Britain.
939,213  10/1963  Great Britain.

MORRIS O. WOLK, *Primary Examiner.*

JOSEPH SCOVRONEK, *Examiner.*

R. E. SERWIN, *Assistant Examiner.*